United States Patent [19]

Ishikawa

[11] 4,257,054

[45] Mar. 17, 1981

[54] RECORDING APPARATUS

[75] Inventor: Chuji Ishikawa, Kawasaki, Japan

[73] Assignee: Ricoh Company, Ltd., Japan

[21] Appl. No.: 62,134

[22] Filed: Jul. 30, 1979

[30] Foreign Application Priority Data

Aug. 2, 1978 [JP] Japan .................................. 53-94200

[51] Int. Cl.$^3$ ...................... G01D 15/06; G01D 15/16

[52] U.S. Cl. .................................. 346/155; 346/139 C

[58] Field of Search ............... 346/153, 155, 156, 165, 346/139 C; 355/3 R, 3 DR

[56] References Cited

U.S. PATENT DOCUMENTS

| | | | |
|---|---|---|---|
| 4,053,899 | 10/1977 | Strange | 346/155 X |
| 4,074,283 | 2/1978 | Fink et al. | 346/155 X |
| 4,137,536 | 1/1979 | Hinz et al. | 346/155 |

*Primary Examiner*—Bernard Konick
*Assistant Examiner*—Aristotelis M. Psitos
*Attorney, Agent, or Firm*—McGlew and Tuttle

[57] ABSTRACT

The recording apparatus comprises a recording electrode and a drum disposed in close proximity with the recording electrode with a predetermined small clearance therebetween and is capable of forming image directly or latent electrostatic image on a recording sheet which passes through the clearance by applying signals corresponding to image information to be recorded on the recording sheet to said recording electrode. A pair of rotating members are supported swingably by the recording electrode on each of its opposite ends and in pressure contact with the peripheral surface of the drum under the weight of the recording electrode so that the clearance between the recording electrode and the drum is retained.

16 Claims, 19 Drawing Figures

RECORDING APPARATUS

BACKGROUND OF THE INVENTION

The present invention relates to a recording apparatus having a recording electrode and a drum, which are disposed with a predetermined small clearance therebetween, and capable of forming a visible image or electrostatic image on an image supporting member by applying signals, corresponding to image information to be recorded, on the recording electrode.

The apparatus can be classified into a direct recording type and an electrostatic recording type.

In the direct recording type apparatus, a donor drum whose surface is covered uniformly to conductive magnetic toner is disposed in close proximity with a recording electrode with a predetermined clearance therebetween. A recording sheet is caused to pass through the clearance. Simultaneously, signals, signals corresponding to image information, are applied to the recording electrode and the donor drum is rotated while retaining the predetermined clearance, whereby the image corresponding to the image information is recorded on the recording sheet.

In in the electrostatic recording apparatus, the surface of a dielectric drum is uniformly charged and signals, corresponding to image information to be recorded, are applied to a recording electrode. The recording electrode is disposed in close proximity with the dielectric drum with a predetermined clearance therebetween, so that the charges on the surface of the dielectric drum are neutralized, in accordance with the applied signals, to form a latent electrostatic image corresponding to the image information. The latent electrostatic image is developed with toner and the toner image is then transferred to a recording sheet.

Conventionally, in the direct recording apparatus, the small clearance between the recording electrode and the donor drum is maintained by a mechanism in which support shafts are projected from the opposite ends of the recording electrode. Guide rollers, rotatably attached to the respective support shafts through bearings, contact cylindrical guide rails on the opposite sides of the donor drum. Precise maintenance of the close or small clearance is important in the sense that when the clearance is too small, the recording paper contacts with the surface of the donor drum and toner adheres to the recording paper, resulting in the smearing of the background of the recording paper. On the other hand, when the clearance is too great, toner is not attracted to the surface of the recording paper due to the loss of electrical energy within the clearance. Furthermore, when the clearance changes either regularly or irregularly, the density of recorded image changes, resulting in the reduction of image quality.

Therefore, it is required that the small clearance between the donor drum and the recording electrode be maintained constant along the axial direction of the drum.

However, if the bearings or the guide rollers are eccentric in the above-mentioned conventional direct recording apparatus, the clearance between the donor drum and the recording electrode is directly changed by the eccentric distance, and the change of the clearance as great as 5$\mu$ in inevitable even if any precision bearings are employed.

The conventional electrostatic recording apparatus has the same limitations, with respect to the clearance, as that of the conventional direct recording apparatus.

SUMMARY OF THE INVENTION

It is therefore an object of the present invention to provide a recording apparatus in which the clearance between the recording electrode and the drum is maintained practically constant even if the bearings or guide rollers for use with the recording electrode are eccentric. It is a further object of the invention to provide means for adjusting the clearance.

According to the present invention, a pair of swingable rotating members are supported by the recording electrode on each of its opposite ends and in pressure contact with the peripheral surface of the drum and if the rotating members are eccentric, the clearance between the recording electrode and drum is not directly affected by the eccentricity of the rotating members and, furthermore, if one of the rotating members is moved upwards by toner particles or dust which happens to come between the rotating member and the surface of the drum, the effect of the upward movement of the rotating member on the clearance is reduced by half, whereby stable recording is attained.

It is an object of the invention to provide an image-recording apparatus comprising a support, a drum, and a recording electrode. Means for rotatably mounting the drum on the support and for supporting the recording electrode with the drum and the recording electrode being relatively movable to maintain a close clearance therebetween are provided. The drum has an outer surface having an image-forming portion. Two roller members on each side of the drum engage the drum surface at circumferentially space intervals. Bracket means are connected to the support and carry the roller members for engaging the surface. A support plate is provided on each side of the recording electrode and has a central portion pivotally connected thereto and also has an edge portion engaging the bracket means. The support plate is pivotable to maintain a predetermined clearance between the drum and the electrode.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
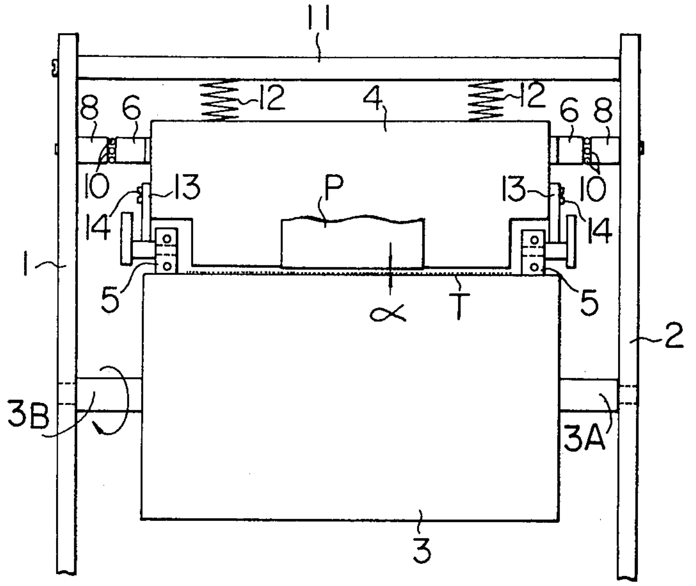
FIG. 1 is a diagrammatic view of a direct recording apparatus according to the present invention.
Figure 2:
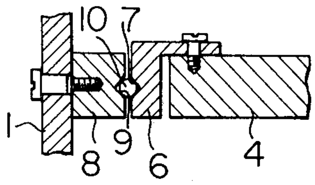
FIG. 2 is an enlarged sectional plan view of a left side plate of part of the direct recording apparatus of FIG. 1.

Referring to FIG. 1, there is shown a diagrammatic view of a direct recording apparatus according to the present invention. In FIG. 1, a donor drum 3 is mounted rotatably on a frame with its axis extending between a left side plate 1 and a right side plate 2. The drum 3 is supported at each end by a shaft 3A, 3B rotatably connected to the side plates 1, 2. A recording electrode 4 is disposed in close proximity with the donor drum 3 with a predetermined clearance therebetween. A pair of rollers 5, including bearings, are positioned at on each end of the recording electrode 4 in contact with the donor drum 3. The recording electrode 4 is supported in the axial direction of the donor drum 3. As shown in FIG. 2, a vertical V-shaped groove 7 is formed in guide plates 6 which are attached to the opposite ends of the recording electrode 4. A V-shaped groove 9 is similarly formed in each of guide plates 8, which are respectively attached to the side plates 1 and 2, so as to respectively face V-shaped grooves 7 of the guide plates 6. A plurality of balls 10 are inserted between the groove 7 and the groove 9 which face each other so that the recording electrode 4 can be moved vertically.

The rollers 5 may be biased with a pressure contact with the peripheral end surfaces of the donor drum by the weight of the recording electrode as well as 3 by compression coil springs 12 which are connected between the recording electrode 4 and a beam 11 situated above the recording electrode 4.

Figure 3:
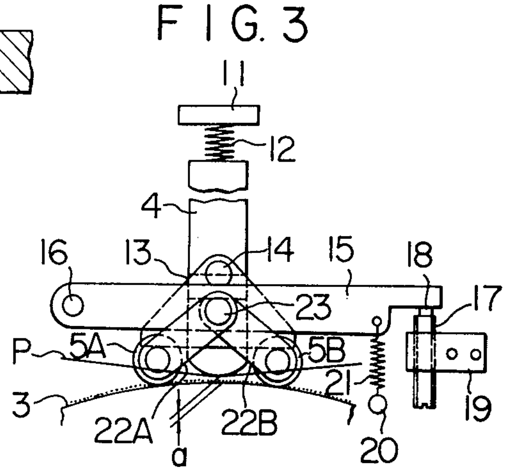
FIG. 3 is a schematic side view of a main portion of the direct recording apparatus of FIG. 1.
Figure 4:
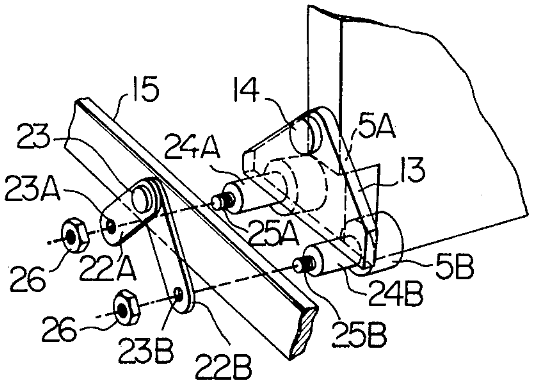
FIG. 4 is a fragmentary perspective view of FIG. 3.

The recording electrode 4 is also supported by the rollers 5 transversely of the axial direction of the donor drum 3. Referring to FIGS. 3 and 4, at the opposite end portions of the recording electrode 4, there are triangular support plates 13 of the same shape which are pivotally connected to the recording electrode and by pins 14, respectively, so as to be swingable about their top portions.

Figure 6:
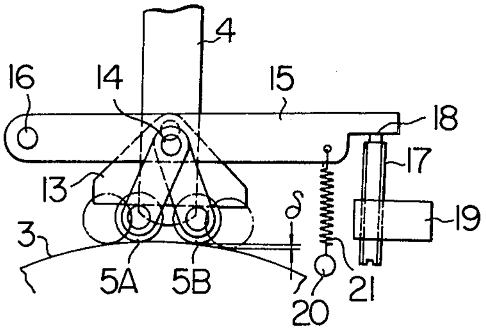
FIG. 6 shows a means for adjusting the clearance between the recording electrode and the surface of the donor drum of the direct recording apparatus of FIG. 1.

On the inner side of each of the side plates 1 and 2, as best shown in FIGS. 3 and 6, a lever 15 is swingably supported on the side plate by a pin 16, disposed in one end of the lever 15, so as to be swingable about the pin 16. A top portion 18 of a screw 17 engaged in a fixed support 19 is in contact with a lower portion of the other end of the lever 15. The lever 15 is urged clockwise about pin 16 by a coil spring 21 attached to each of the side plates 1 and 2 at a connection 20.

At the center of the lever 15, a pair of arms 22A and 22B are attached swingably with their ends pivotally fixed by a pin 23 as shown in FIG. 4. Screw portions 25A and 25B of cylindrical support members or shafts 24A and 24B are screwed into holes 23A and 23B formed in the opposite end portions of the respective arms 22A and 22B, and are fixed by nuts 26. Rollers 5A and 5B having bearings (not shown), are mounted on the support members 24A and 24B, respectively. Each support plate 13 is contactingly mounted on the support members 24A and 24B. The rollers 5A and 5B are in pressure contact with the peripheral surface of the donor drum 3, due to the weight of the recording electrode 4, so that the recording electrode 4 is disposed in close spaced proximity with the donor drum 3 with a predetermined clearance $\alpha$.

In FIG. 1, reference symbol P represents a recording paper and reference symbol T represents toner.

Figure 5:
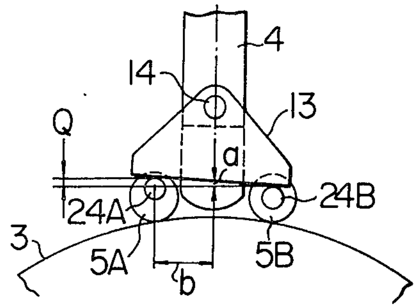
FIG. 5 shows the eccentric state of one of the rollers in pressure contact with a donor drum of the direct recording apparatus of FIG. 1.

Now the operation of this recording apparatus will be explained by referring to FIG. 5. As the donor drum 3 is rotated, the rollers 5A, 5B are also rotated. However, as shown in FIG. 5, if the support member 24A is moved upwards by the distance Q from its normal position due to the eccentricity of the roller 5A on the left side, the support plate 13 is turned about its contact point of the support member 24B and the support plate 13. The displacement of the support plate 13 at the center of the recording electrode 4 is a, which is significantly smaller than the distance Q. As the support member 13 is moved upwards, the recording electrode 4 is also moved upwards since the pin 14 connects the support plate 13 with the recording electrode 4 and the position of the pin 14 becomes the point of force application for moving the recording electrode 4. Since the support plate 13 is turned slightly about the contact point between the support member 24B and the support plate 13, the vertical movement of the recording electrode 4 by the pin 14 is far smaller than the distance a. Therefore, if the eccentricity of the roller 5A is approximately $5\mu$, the effect of the eccentricity on the clearance between the recording electrode 4 and the donor drum 3 is extremely small. In this case, however, it is necessary that the donor drum 3 does not have an eccentricity equivalent to the distance b between the center of the recording electrode 4 and the center of the support member 24A (FIG. 5). According to an experiment conducted by the inventor of this invention, the donor drum 3 was eccentric to the extent that the level of the outer peripheral surface of the donor drum 3 changes in the range of approximately $20\mu$, but this eccentricity could be ignored in the range as short as b on the peripheral surface of the donor drum 3. This is because the donor drum 3 follows the recording electrode 4 and the clearance between the donor drum 3 and the recording electrode 4 can be maintained constant irrespective of the eccentricity of the donor drum 3.

The clearance $\alpha$ between the donor drum 3 and the recording electrode 4 can be adjusted. For example, if the clearance $\alpha$ is increased, the screw member 17 is rotated and moved upwards, whereby the lever 15 is turned counterclockwise against the bias of the spring 21 (FIG. 3). When the lever 15 is turned counterclockwise, the arms 22A, 22B of the support members 24A, 24B to which the load of the recording electrode 4 is applied are swung with an equal angle with respect to the lever 15 so as to come closer to each other. Therefore, the rollers 5A, 5B come closer to each other, moving from the dash line position to the solid line position in FIG. 6, while maintaining pressure contact with the surface of the donor drum 3, so that the clearance $\alpha$ is increased.

Figure 7:
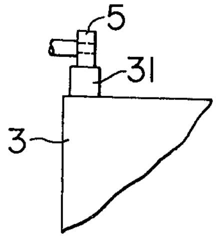
FIG. 7 is a partial diagrammatic view of the donor drum and the roller between which a bearing member is inserted in another embodiment of a recording apparatus according to the present invention.

Referring to FIG. 7, there is shown part of a second embodiment of a recording apparatus of the invention. In this embodiment, the rollers 5A, 5B are not in direct contact with the peripheral surface of the donor drum 3, but a bearing member 31 mounted around the donor drum 3 is inserted between the roller 5 and the donor drum 3, whereby the abrasion of the donor drum 3 is reduced.

FIG. 8 through FIG. 19 illustrate the improvements in the construction of the portions near the contact area between the rollers 5A, 5B and the opposite peripheral end portions of the donor drum 3 which assure maintenance of the clearance between the recording electrode 4 and the donor drum 3 by preventing power toner from scattering into the contact area.

Figure 8:
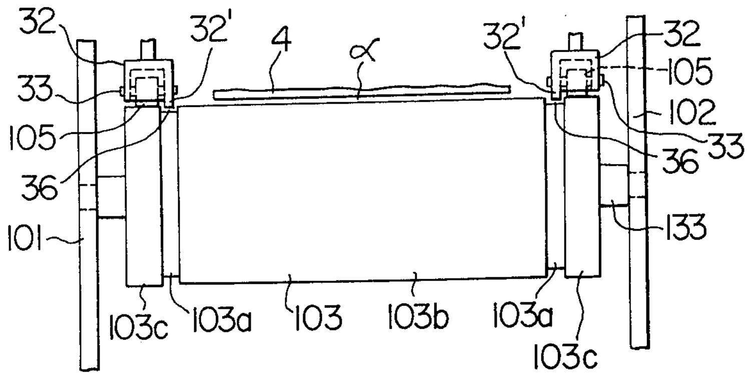
FIG. 8 is a front view of a donor drum having guide surfaces with which spacers are in contact for maintaining a small clearance in a stable manner, an effective image formation area for forming image therein, and circular grooves formed between the effective image formation area and the guide surfaces.

Referring to FIG. 8, a donor drum 103 is rotatably supported on a shaft 133 between sides plates 101, 102, which are disposed on the opposite sides, respectively. The donor drum 103 has a circular groove **103*a* in each of the opposite end portions of donor drum 103. The space between the circular grooves 103*a* constitutes an effective image formation area 103*b* where toner is practically held. The area from each of the circular grooves 103*a* to each drum side end portion constitutes a guide surface 103*c*. The effective image formation area 103*b* is processed by electroforming so as to have minutely undulated surface texture by after accurate a finish grinding. The guide surface 103*c* is subjected to a hardening processing, such as a hard alumite processing and hard chrome processing, after a highly accurate grinding finish, so that the surface hardness of the guide surface 103*c*** is increased.

The roller 105 is rotatably supported on a roller bracket through a shaft 33. The roller bracket 32 is supported by a movement plate (not shown).

Each of the rollers 105 is brought into pressure contact with the guide surface **103*c* of the donor drum 103 and is rotated on the guide surface 103*c* in accordance with the rotation of the drum 103, so that the predetermined clearance $\alpha$ between the outer peripheral surface of the drum 103 and the recording electrode 4 is kept constant with the peripheral surface of the drum 103** set as a standard surface.

Since the surface of the effective image formation area **103*b* is processed so as to be minutely undulated, electric charges are concentrated in the convex portion of the minutely undulated surface, so that toner is aligned regularly, reducing scattering of the toner onto the recording sheet P. Furthermore, since the guide surface 103*c* of the donor drum 103 has been subjected to hardening processing, it is not abraded easily, so that the clearance $\alpha$ can be maintained substantially constant for a long period of time. Furthermore, the circular groove 103*a* formed between the effective image formation area 103*b* and the guide surface 103*c* serves to prevent toner, on the effective image formation 103*b*, from entering the guide surface 103*c*. The circular groove 103*a* also serves as a divisional zone when the surface treatment of the drum 103 is conducted, which makes the surface treatment easier. The surface treatment of the effective image formation area 103*b* is conducted by electroforming, while the surface treatment of the guide surface 103*c* is conducted by such a processing as hard alumite processing and hard chrome processing. Thus, the two portions 103*b*, 103*c* are processed in the entirely different manners. The circular groove 103*c*** serves to prevent one surface treatment method from adversely effecting the other surface treatment.

Figure 9:
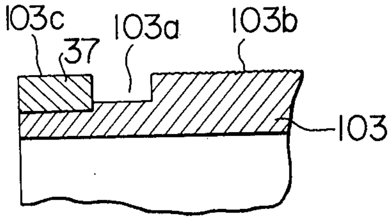
FIG. 9 is a partially enlarged sectional view of another example of the donor drum shown in FIG. 8.

Referring to FIG. 9, the guide surface **103*c* can be constructed of a hardened sleeve element 37 which is attached to the side end portion of the drum 103**.

Figure 11:
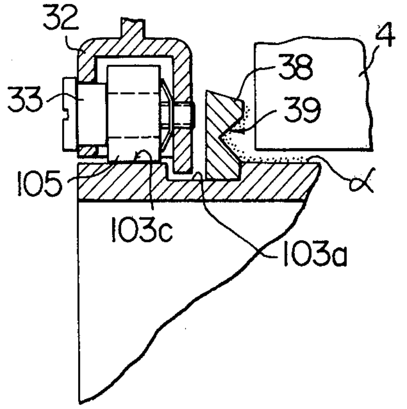
FIG. 11 is an enlarged sectional view of a main portion of the donor drum of FIG. 10.
Figure 10:
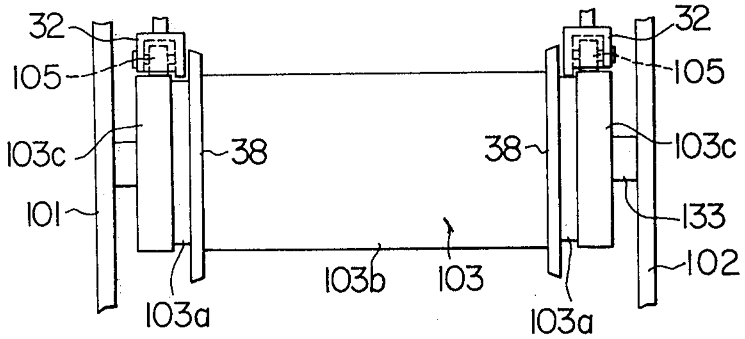
FIG. 10 is a front view of an example of a donor drum in which a flange member is disposed in the circular grooves.

As shown in FIGS. 10 and 11, a circular flange member 38, with a predetermined diameter is attached to each side of effective image formation area **103*b* adjacent the circular groove 103*a*. The circular flange member 38 is disposed between the effective image formation area 103*b* and the guide surface 103*c*, whereby both are sealed. Therefore, even if toner is scattered in the effective image formation area 103*b* of the donor drum 103, the circular flange member 38 prevents toner from scattering onto the contact area of the roller 105 and the guide surface 103*c*. In this embodiment, the circular flange member 38 has a groove 39, whose section is V-shaped, on the end surface on the side of the effective image formation area 103*b*. The groove 39 serves to prevent toner, in the effective image formation area 103*b*, from moving to the guide surface 103*c* along the surface of the circular flange member 38 at the undercut portion of the groove 39**.

Referring to FIG. 12 through FIG. 15, there are another group of embodiments of the invention, in which the movement of the toner from the effective image formation area **103*b* to the guide surface 103*c*** is prevented, as will now be explained.

Figure 12:
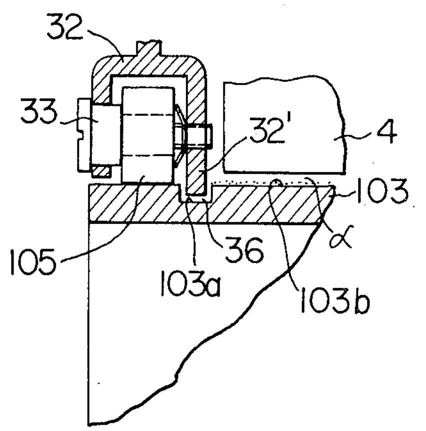
FIG. 12 is an enlarged sectional view of a main portion of an example of means for forming a labyrinth in the circular groove.

In FIG. 12, the roller bracket 32 is shaped like a cap capable of covering the roller 105, and has a skirt portion 32′ on the side of the effective image formation area **103*b*. The skirt portion 32′ extends within the circular groove 103*a* with a predetermined clearance therebetween, and a labyrinth 36 is formed by the spacing between the circular groove 103*a* and the skirt portion 32′**.

By the above-mentioned construction, even if the toner in the effective image formation area **103*b* of the drum 103 is scattered and directed to the opposite end portions of the drum 103, the toner is prevented from entering the contact area of the roller 105 and the guide surface 103*c* by the roller bracket 32 and the labyrinth 36**, whereby the contact area is kept clean and free from the toner, so that the clearance $\alpha$ can be maintained at a predetermined clearance value.

Figure 13:
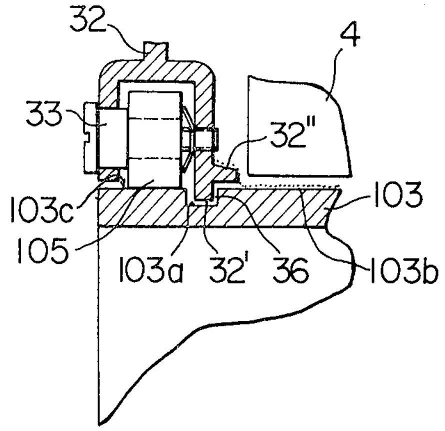
FIGS. 13, 14 and 15 are enlarged sectional views of the main portions of different examples of means for forming a labyrinth in the circular groove.

In a further embodiment as shown in FIG. 13, the skirt portion 32′ of the roller bracket 32 has a projected member 32″ facing the outer peripheral surface of the effective image formation area **103*b* of the donor drum 103, with a predetermined small gap therebetween. In this case, the effective length of a labyrinth 36 formed between the roller bracket 32 and the donor drum 103 becomes longer, so that the entrance of toner into the portion of the guide surface 103*c*** is more securely prevented.

Figure 14:
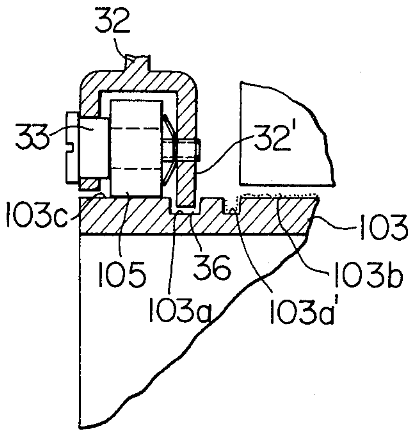

In a further embodiment as shown in FIG. 14, an additional circular groove 103*a'* is formed closer to the side of the effective image formation area 103*b* than the circular groove 103*a* with a space placed between the circular grooves 103*a* and 103*a'*. In this case, in order for the toner to enter the portion of the guide surface 103*c* of the drum 103, the toner has to move across the circular groove 103*a'*, as well as labyrinth 36, which makes it very difficult for the toner to enter the portion of the guide surface 103*c*. Furthermore, toner dropped into the circular grooves 103*a*, 103*a'* may be discharged therefrom by centrifugal force or under its own weight due to the rotation of the drum 103.

Figure 15:
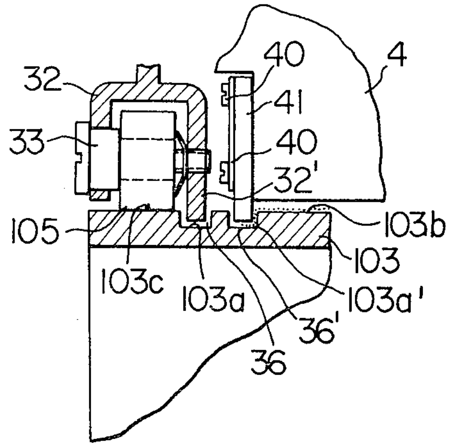

In the embodiment as shown in FIG. 15, an engagement member 41, which serves as the labyrinth formation member, is fixedly supported on the recording electrode 4 by a screw 40. The engagement member 41 is fitted into a circular groove 103*a'* with a predetermined clearance therebetween, so that another labyrinth 36' is formed between the guide surface 103*c* and the drum 103. In such embodiment, since the two labyrinths 36, 36' are formed between the effective image formation area 103*b* of the drum 103 and the guide surface 103*c*, the entrance of toner into the portion of the guide surface 103*c* can be much more securely restrained.

Figure 16:
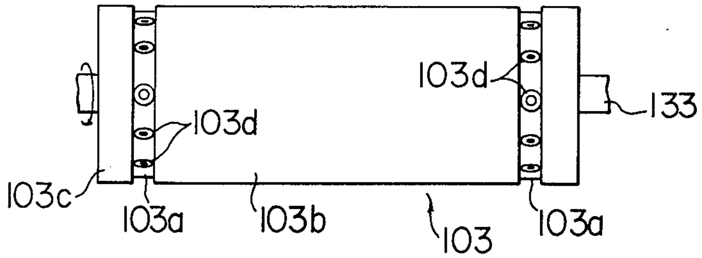
FIG. 16 is a front view of an example of a donor drum provided with toner discharge holes in the circular grooves.
Figure 17:
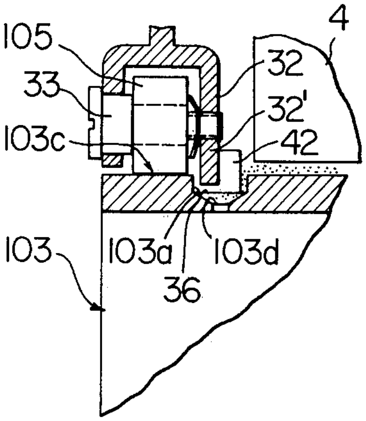
FIG. 17 is an enlarged section of the main portion of the donor drum in FIG. 16.

Referring to FIGS. 16 and 17, a further embodiment of the invention, which is capable of preventing toner from entering the portion of the guide surface 103*c* more securely, is illustrated.

In FIGS. 16 and 17, the donor drum 103 has a plurality of toner discharge holes 103*d* which are opened at the bottom surface of each of the circular grooves 103*a*. Each of the toner discharge holes 103*d* passes through the cylindrical donor drum 103 and the opening thereof directed to the circular groove 103*a* is tapered so as to open the full size of the circular groove 103*a*.

The roller bracket 32 is provided with a scraper plate 42 made of rubber or the like at a portion downstream in view of the rotating direction of the drum 103. The scraper plate 42 is extends within the circular groove 103*a* so as to collect toner in the circular groove 103*a*.

By the above-mentioned construction, even if the toner in the effective image formation area 103*b* of the drum 103 is directed to enter the contact area of the guide surface 103*c* and the roller 105, such entering of the toner is prevented by the circular groove 103*a* and the labyrinth 36 formed in the portion of the groove 103*a*. The toner dropped into the groove 103*a* is collected by the scraper plate 42 and discharged out of the groove 103*a* through the toner discharge holes 103*d*. Accordingly, the contact portion between the guide surface 103*c* of the drum 103 and the roller can be always maintained clean and free from toner and the clearance $\alpha$ can be always maintained at a predetermined value.

In the embodiments so far explained, the labyrinth is formed in the groove 103*a*, whereby the entering of toner into the guide surface 103*c* is prevented. In contrast with this, referring to FIGS. 18 and 19, embodiments provided with means capable of removing toner which has already entered the portion of the guide surface 103*c* will now be explained.

Figure 18:
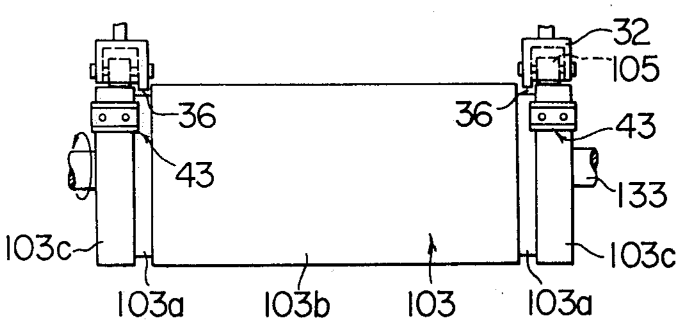
FIG. 18 is a front view of an example of a powder toner removing means provided on the guide surface of a donor drum.

In FIG. 18, a scraper blade 43 is provided, which is positioned downstream of the contact portion of the roller 105 and the guide surface 103*c* in view of the rotating direction of the drum 103 and which is slidably in contact with the guide surface 103*c*. The scraper blade 43 can be made of rubber or similar material. The scraper balde 43 is held between two support plates (not shown) and fixed thereto by a screw (not shown). Furthermore, the scraper blade 43 has an inclined surface which is inclined against the rotating direction of the donor drum 103, and the scraped toner is guided by the inclined surface and removed. The scraper blade 43 is supported by a stationary member (not shown) and is brought in pressure contact with the guide surface 103*c* with an appropriate pressure.

By the above-mentioned construction, even if the toner in the effective image formation area 103*b* is directed to enter the contact area of the guide surface 103*c* and the roller 105, such enter of the toner is prevented by the circular groove 103*a* and the labyrinth 36 formed in the portion of the groove 103*a*. Should the toner pass through the portion and be deposited on the guide surface 103*c*, the toner is removed and scraped from the guide surface 103*c* by the scraper blade 43 before reaching the contact area of the guide surface 103*c* and the roller 105. Accordingly, the contact portion between the guide surface 103*c* of the drum 103 and the roller 105 can be always maintained clean and free from toner, whereby the clearance $\alpha$ can be always maintained at a predetermined value.

Figure 19:
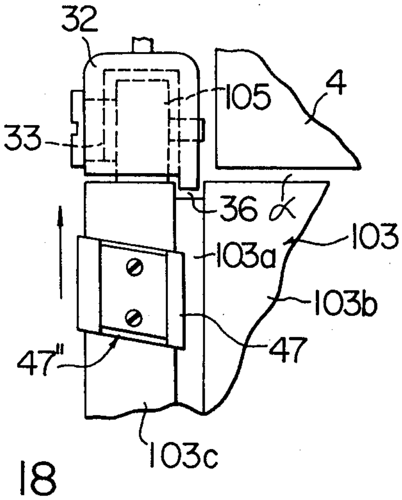
FIG. 19 is a front view of a portion of still another toner removing means according to the invention.

In the embodiment in FIG. 19, a scraping edge 47'' of the scraper blade 47 is inclined with respect to a generating line of the donor drum 103. This inclination direction is such that the side end portion of the drum 103 is positioned downstream of the rotating direction of the drum 103, deviated from the center side of the drum 103. Accordingly, in this case, the toner scraped by the scraper blade 47 is guided slantingly along the scraping edge 47'' and removed towards the side end portion of the drum 103, whereby it is prevented that the toner remains in the contact portion between the drum 103 and scraper blade 47.

While the specific embodiments of the invention have been shown and described in detail to illustrate the application of the principles of the invention, it will be understood that the invention may be embodied otherwise without departing from such principle.

What is claimed is:

1. In a recording apparatus of the type wherein a recording electrode and a drum which are disposed in close proximity with each other with a predetermined close clearance therebetween and which are capable of forming a visible image or a latent electrostatic image on a recording sheet which passes through the clearance by applying signals corresponding to image information to be recorded on the recording sheet to said recording electrode, the improvement comprising a pair of support members swingably mounted on each of the opposite ends of said recording electrode and at least two roller members operatively engaging each of said support members in pressure contact with the peripheral surface of said drum under the weight of said recording electrode thereby retaining said clearance between said recording electrode and said drum.

2. In a recording apparatus of the type wherein a recording electrode and a drum which are disposed in close proximity with each other with a predetermined close clearance therebetween and which are capable of forming a visible image or a latent electrostatic image on a recording sheet which passes through the clearance by applying signals corresponding to image information to be recorded on the recording sheet to said recording electrode, the improvement which comprises a support plate mounted on each of the opposite end surfaces of said recording electrode, said support plate being swingably supported by said recording electrode, a pair of levers, each of said levers being disposed on the opposite sides of said recording electrode, each of said levers having an end being swingably supported by a pair of side plates, a pair of arms whose respective end portions are swingably supported by each of said levers, a pair of rotating members which are rotatably supported by the other end portions of said arms on each side of said recording electrode, each of said support plates being placed on each pair of said rotating members in pressure contact with said drum under the weight of said recording electrode, vertical movement adjustment means for adjusting the position of a free end portion of each of said levers, and said recording electrode being supported by said support in such a manner that said recording electrode can be moved toward and away from said drum, and said vertical movement adjustment means being operative to adjust the position of said free end portion of each of said levers to maintain said predetermined close clearance between said recording electrode and said drum.

3. An image recording apparatus comprising a support, a drum, a recording electrode, means for rotatably mounting said drum on said support and for supporting said recording electrode with said drum and said recording electrode being relatively movable to maintain a close clearance therebetween, said drum having an outer surface having an image forming portion, two roller members on each side of said drum engaging said surface at circumferentially spaced intervals, bracket means connected to said support and carrying said roller members for engaging said surface, a support plate on each side of said recording electrode having a central portion pivotally connected thereto and having an edge portion engaging said bracket means, said support plate being pivotable to maintain a predetermined clearance between said drum and said electrode.

4. The image recording apparatus of claim 3, wherein said bracket means includes a lever member pivotally connected to said support, a pair of arm members, each of said arm members having a first end portion swingably connected to said lever member and a second end portion, first and second support shafts each carrying one of said roller members being respectively connected to one of said second end portions of said arms, and said support plate being engaged with each of said support shafts.

5. The image recording apparatus of claim 4, wherein said support shafts engaging said support plates are disposed along said edge portion on opposite sides of said central portion for pivoting said support plate.

6. The image recording apparatus of claim 3, further comprising vertical movement adjusting means for limiting movement of said bracket means to maintain the clearance between said recording electrode and said drum.

7. The image recording apparatus of claim 6, further comprising spring means engaging said bracket means for biasing said bracket means toward said vertical movement adjusting means.

8. The image recording apparatus of claim 3, further comprising spring means operatively connected to said recording electrode for biasing said roller members into a pressure contact with said drum.

9. The image recording apparatus of claim 3, further comprising a bearing member mounted on said surface of said drum for engagement said roller members.

10. The image recording apparatus of claim 3, wherein said drum surface includes guide portions, said image forming portion being disposed intermediate said guide portions, said drum surface having a groove intermediate said image forming portion and each of said guide portions.

11. The image recording apparatus of claim 10, wherein said bracket means includes a bracket having a portion extending into said groove so as to define a labyrinth between said image forming portion and each of said guide portions.

12. The image recording apparatus of claim 11, wherein said bracket includes a member overlying a part of said image-forming portion adjacent said groove.

13. The image recording apparatus of claim 11, wherein said drum surface includes a second groove intermediate said first-mentioned groove and said image-forming portion.

14. The image recording apparatus of claim 13, further comprising a member connected to each side of said recording electrode extending into a respective second groove.

15. The image recording apparatus of claim 11, wherein said surface includes a discharge hole communicating with said groove.

16. The image recording apparatus of claim 11, further comprising scraper means associated with said guide portion.

* * * * *